United States Patent [19]

Mazumder

[11] 4,243,216
[45] Jan. 6, 1981

[54] DOUBLE DOCUMENT DETECTION SYSTEM

[75] Inventor: Ali T. Mazumder, Waterloo, Canada

[73] Assignee: NCR Canada Ltd. - NCR Canada Ltee, Missisauga, Canada

[21] Appl. No.: 47,460

[22] Filed: Jun. 11, 1979

[51] Int. Cl.³ .............................................. B65H 7/06
[52] U.S. Cl. .................................. 271/263; 340/562; 340/674
[58] Field of Search ............... 271/263, 262; 340/562, 340/674; 324/61 R; 209/571, 572, 603; 33/143 L, 147 N, 148 N

[56] References Cited

U.S. PATENT DOCUMENTS

| 3,609,735 | 9/1971 | Dauterman et al. | 271/263 X |
| 3,673,589 | 6/1972 | Barrett et al. | 340/562 |
| 3,815,021 | 6/1974 | Kerr | 324/61 R |
| 4,066,969 | 1/1978 | Pearce et al. | 271/263 X |
| 4,154,437 | 5/1979 | Butcheck et al. | 271/263 X |

FOREIGN PATENT DOCUMENTS 661704 11/1951 United Kingdom ............... 271/263

Primary Examiner—Bruce H. Stoner, Jr.
Attorney, Agent, or Firm—J. T. Cavender; Wilbert Hawk, Jr.; George J. Muckenthaler

[57] ABSTRACT

A system for detecting the presence of more than one document along a path during the processing of the documents. A capacitance is introduced by the plural documents in contact with each other and wherein a delay signal is combined with an original signal to generate a multiple document detect signal for indicating the presence of the multiple documents.

3 Claims, 4 Drawing Figures

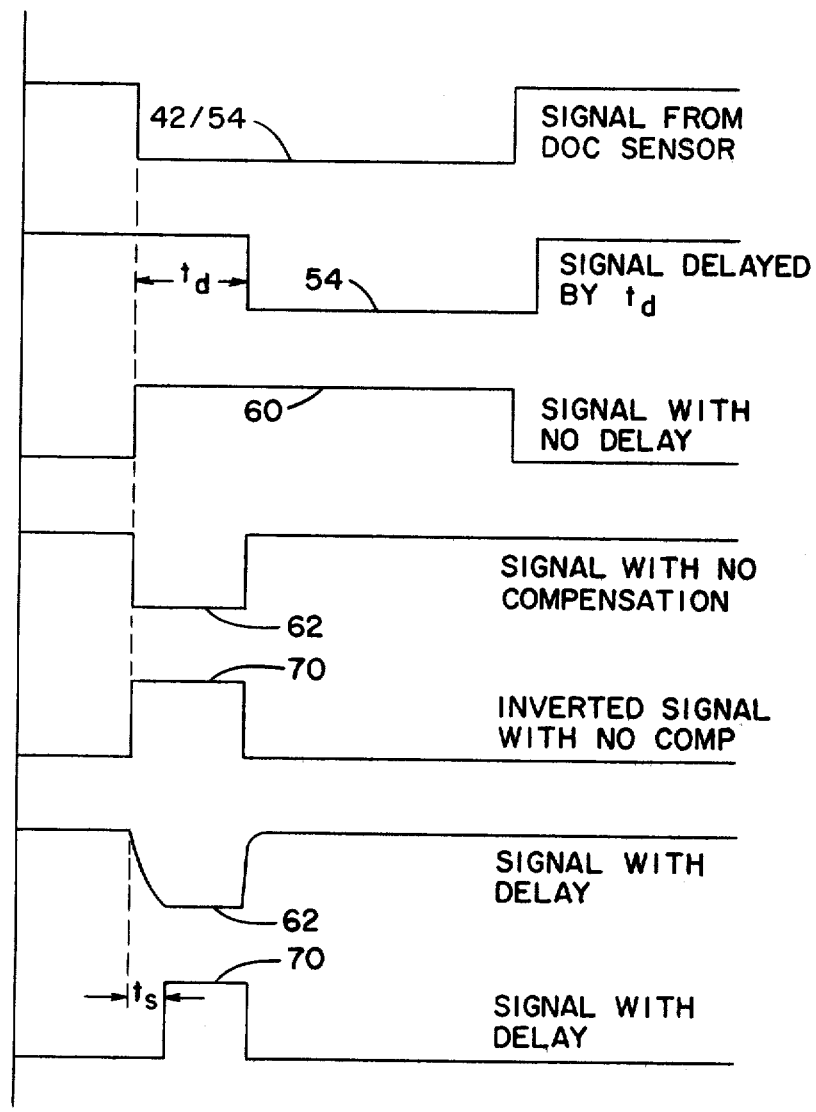

DOUBLE DOCUMENT DETECTION SYSTEM

BACKGROUND OF THE INVENTION

In the field of feeding, separating and sorting documents, there have been many different mechanisms and devices designed to feed and to convey or transport such documents along a path wherein it is important that each and every document being transported follows in successive manner and that two or more documents do not overlap during the time of transport when processing the documents.

Known mechanisms and devices have included mechanical apparatus such as a lever or like member which would be positioned in one operable condition when there was a single document passing a particular station and such lever would be in another operable condition when two or more documents were passing at the same time. Another known apparatus took the form of a light source and a light-sensitive device which would have an output at one level when a single document was being fed and an output at another level when the documents were in overlapped condition. Still other apparatus made use of air pressure as well as the absence of air altogether to detect overlap feeding of documents.

Representative prior art in the area of detection of double documents includes U.S. Pat. No. 2,994,528, issued to H. E. Hull et al on Aug. 1, 1961, which discloses a device for detecting the feeding of overlapping documents and wherein ports for detecting documents are formed in two opposed spaced walls of a channel and the ports are connected with a vacuum source. When two documents are fed in overlapping relation into the channel, the lower atmospheric pressure inwardly of both ports and the atmospheric pressure between the documents causes the documents to cover the ports which causes a pressure drop indicating the presence of overlapping documents.

U.S. Pat. No. 3,026,419, issued to J. I. Aweida et al on Mar. 20, 1962, discloses an overlap detector using photoelectric cells to discover an overlap condition and wherein the change in intensity of a beam of light alters the output of a solar cell with the output being adjusted as a function of the thickness of an average document.

U.S. Pat. No. 3,182,301, issued to E. R. Kolb on May 4, 1965, discloses a multiple sheet detector with sensing means responsive to the change in thickness of the stream of sheets and includes control means for performing a control operation when the change in stream thickness is more than that of a single sheet thickness and with subsequent pulses having magnitudes dependent upon the sheet thickness and analyzed both as to magnitude and time to determine whether or not the sheets are properly passing a particular station.

U.S. Pat. No. 3,283,163, issued to A. J. Folmar on Nov. 1, 1966, discloses a photosensitive overlapped document detector utilizing a light source and a light-sensitive element along with apparatus for separating overlapped documents and wherein light from the source passes through one document and then is attenuated and thereafter the attenuated light is of insufficient strength to operate the light-sensitive element in the same manner as would a single document and a signal is developed for indicating overlapped documents.

U.S. Pat. No. 3,627,303, issued to A. Zeewy on Dec. 14, 1971, discloses a circuit for providing a signal for incorrect thickness of a book and wherein the signal operates with a delay to prevent operation of the machine and thereby reject the book. The delay for rejection is introduced by a register which is shifted by a clock pulse derived from a switch.

And, U.S. Pat. No. 3,731,916, issued to R. S. Pettet on May 8, 1973, discloses discriminating apparatus for moving translucent sheets and utilizing a photoelectric detection device in a circuit along with a first differential amplifier to produce a first signal output when the device detects light in excess of a first predetermined value and a second differential amplifier adapted to produce a second output signal when the device detects light in excess of a second predetermined value.

SUMMARY OF THE INVENTION

The present invention relates to a processing operation for documents and more particularly, to means for detecting or sensing the presence of two or more documents in overlapping manner as such documents are being fed or transported along a path toward pockets or bins. Although the documents or checks are usually placed in a document hopper in random manner, a feeder unit is positioned at the hopper to pick off each document from a stack or pile, and to initiate individual and successive flow of the documents along the path or track for processing of each document. In this respect, however, the feeder unit sometimes advances more than one document at a time and it is highly desirable that documents emerging from the feeding unit be in singular arrangement as they are advanced toward the processing area of the machine.

The documents are directed in a path or track between a pair of metallic arms which are normally arranged in opposed manner. Stray capacitance is used in the practice of the invention and is defined as the capacitance introduced into a circuit by reason of the presence of leads and wires connecting the circuit components. When a single document is passing between the pair of arms, the document serves as the insulating material or dielectric between the plates of the capacitor. In the case of the single document, an R-C signal is utilized to introduce a delay to compensate for the stray capacitance due to factors which include the wires, leads and the arms in contact with the document.

When two or more documents are in position between the arms, the dielectric value changes by reason of the increased spacing or air gap between the arms caused by the multiple document layers (increased ares), and much larger delay is introduced to the document sensing signal. The delay is in the form of an R-C signal and represents the document capacitance of two or more documents in contact with each other.

The delayed signal is combined with the original document sensing signal to generate a multiple document detect signal which can be used to direct the overlapping documents to a special location or to stop the feeding of the documents along the path. The stray capacitance or that capacitance which is due to multiple documents sticking together and overlapping along the document path is used to delay the transmission of the document sensing signal, the delay time of which is controlled by a resistance in the circuit. The delayed signal is then combined with the original sensing signal to generate the pulse that indicates the presence of multiple documents.

In view of the above discussion, the principal object of the present invention is to provide means for detecting multiple documents.

An additional object of the present invention is to provide a path for one or more documents to pass along at any one time and to provide means for distinguishing the thickness of one document from that of more than one document.

Another object of the present invention is to provide apparatus utilizing the presence of capacitance caused by two documents in contact with each other to introduce a delay in the document sensing signal.

A further object of the present invention is to recognize the documents as being the dielectric of a capacitor and to utilize two or more documents in changing the level of the capacitance and to delay the document sensing signal for indicating the presence of two or more documents.

Additional advantages and features of the present invention will become apparent and fully understood from a reading of the following description taken with the annexed drawing.

BRIEF DESCRIPTION OF THE DRAWING

FIG. 4 illustrates timing diagrams of the several signals generated in the circuit diagram elements of FIG. 3.

Referring to FIG. 1 of the drawing, the subject matter of the present invention is utilized in processing apparatus 10, which may be in the nature of a sorting machine or a proof machine, wherein documents such as bank checks are processed in a data processing operation. A plurality of checks are placed into a hopper 12 and a feeder (not shown) adjacent the hopper selectively feeds or drives each document from the hopper along a path to sorting bins or pockets 26 at the other end of the machine. A reader 14 along the document path reads information or data on each check for the purpose of validating such data and for initiating or actuating control means for directing each check into one of a plurality of the sorting bins or pockets 26 in a manner for separating the checks according to a desired format or program. A keyboard 16 may be provided for entering of data, such as missing or unreadable fields on the documents, by the operator and an encoder 18 encodes any missing fields on the checks or documents. The documents may also have applied thereto an endorsement by an endorser 20, and an identification may be provided by a bank stanp 22, after which both front and back sides of the documents are identified and filmed by a microfilmer 24, following which the documents are transported to the respective bins or pockets 26.

While it is highly desirable that the documents from the hopper are fed in singular manner along the document path so as to correctly and precisely read the information on each check and to deposit the checks in the various pockets, occasionally two or more documents are fed from the hopper at the same time and the processing operation is in error or a jam stops the machine. Additionally, double or multiple documents may stick together and pass through the transport area without jamming which condition would cause the master or system counter and the physical document count to be out of synchronization.

Figure 1:
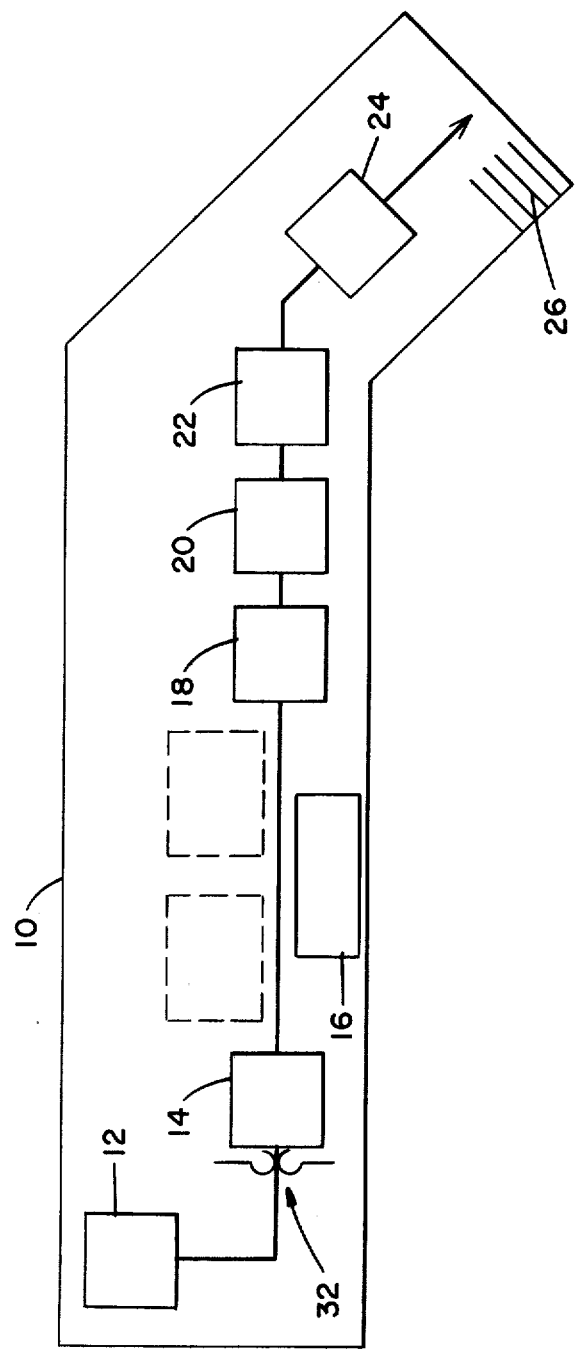
FIG. 1 is a diagrammatic illustration of processing apparatus which incorporates the subject matter of the present invention.
Figure 2:
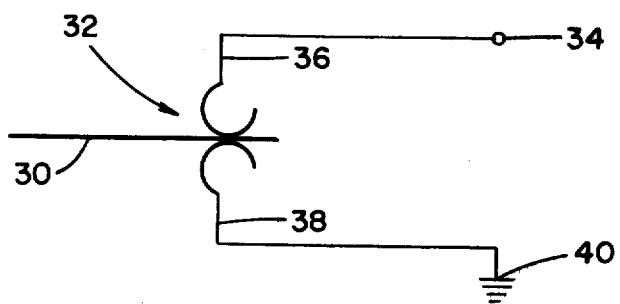
FIG. 2 is a diagrammatic view of a document moving along a path of the processing apparatus.

Apparatus and circuitry is provided in the present invention wherein each document 30 being fed from the hopper 12 is directed between two conducting arms of a sensing device 32 having, as further illustrated in FIG. 2, a terminal 34 for one arm 36 with the other arm 38 being connected to ground potential 40. The sensing device 32 is thus in the form and effective to generate the properties of a capacitor which permits the storage of electrical charges.

Figure 3:
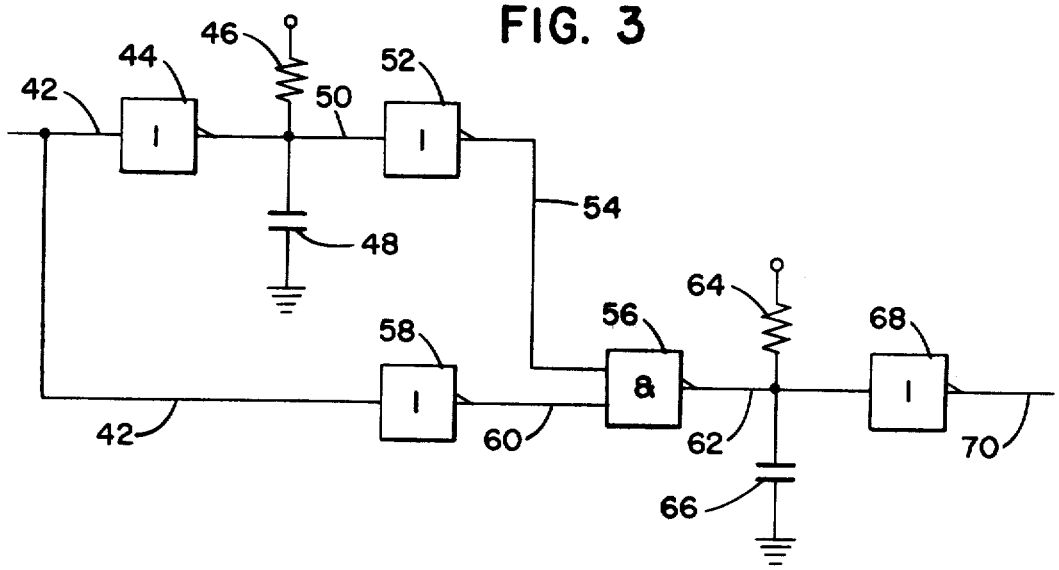
FIG. 3 is a circuit diagram of the important elements of the invention.

Whenever a document 30 enters between such conducting arms 36, 38 of the sensing device 32, a document sensing signal 42 is derived or generated at the input point of the circuit diagram, shown in FIG. 3. This signal or pulse 42 is sent along a path through an inverter 44 with the inverted signal being affected by an R-C circuit comprising a resistor 46 and a capacitor 48 introduced by the presence of the document and thus introduces a delay in the signal designated 50. Detection and effect of such delay within the scope of the present invention will be better understood from description hereinafter provided. The signal 50 is sent through an inverter 52 with the inverted signal or pulse 54 being directed to an AND gate 56. The document sensing signal 42 of FIG. 3 is also sent through an inverter 58 and the inverted signal or pulse 60 is applied to the AND gate 56 along with the signal 54. The outgoing signal 62 from the AND gate 56 is likewise affected by an R-C circuit comprising a resistor 64 and a capacitor 66, which circuit introduces a delay to compensate for stray capacitance introduced by factors other than the presence of documents.

Stray capacitance is herein defined as the capacitance introduced into a circuit by the leads and wires connecting the circuit components. The affected or delayed signal 62, which is the output of the AND gate 56 along with the stray capacitance compensation, is passed through an inverter 68 to generate a multiple document detect signal 70 if more than one document 30 passes between the conducting arms or conductors 36, 38 of the sensing device 32 at any one time. The signal 70 is generated when the delayed signal 62 is compared with the original document sensing signal 42 after being delayed and inverted as signal 54, which signal or pulse 70 can be utilized in a manner to flag or alert the operator that two or more documents have passed through the sensing device 32 at the same time. Such signal can also be used to direct the documents to a special pocket or even to stop the machine.

Referring to the resistor 46 and the capacitor 48 of the first R-C circuit, the capacitor 48 represents the document capacitance introduced by multiple documents in contact with each other whereas the resistor 64 and the capacitor 66 of the second R-C circuit represent the stray capacitance introduced by the arms or conductors 36, 38 in contact with the document. A typical value of the capacitor 48 is in the range of 30–90 picofarads depending upon the thickness of the documents. A typical value of the capacitor 66 is in the range from 10–30 picofarads. The values of resistor 46, resistor 64 and capacitor 66 are selected so that any signal delay caused by the capacitor 48 being less than 40 picofarads is not detected. Thus, it is to be understood that while the transport of both single and double documents introduce capacitance to the circuit via capacitor 48, that capacitance so produced by a single document within the preferred embodiment of the present invention is of an amount to be less than 40 picofarads and hence not detected. This, in effect, restricts the existence of the outgoing signal 62 from the AND gate 56 only to those situations where the capacitance introduced to the circuit by capacitor 48 represents two or more documents being transported in an overlapped condition.

As shown in FIG. 4, which illustrates the timing diagrams of the several signals of the present invention, the original document sensing signal 42 as derived from the document sensor 32 is caused to be low when a document 30 is present. As mentioned previously, inverted signal 54 of such original document sensing signal 42 remains unchanged, i.e. is not delayed, during transport of each document in single file. Such signal 54 is however delayed by the value of $t_d$ by reason of the capacitor 48 and resistor 46 combination at the input to the inverter 52 upon overlapped document transport at any time. Signal 60 is the inverted original signal 42 with no external delay affecting the signal. The signal 62 is shown as being low when no compensating capacitor 66 affects the signal, while signal 70 is shown as a high inverted signal 62 without such compensating capacitor 66 affect. The low signal 62 is also shown with the R-C circuit affect by reason of stray capacitance of the conducting arms 36, 38 in contact with the document 30 and the capacitance affected high signal 70 is shown with a delay $t_s$ affecting the output signal.

The output of AND gate 56 is the signal 62 and is high to generate a low signal 70 when R-C (46,48) and R-C (64,66) circuits are not effective, which is the situation during single document transport. When signal 54 is delayed by reason of the R-C (46,48) circuit detecting overlapping document transport and is compared with signal 60 which is the inverted original input signal 42 with no delay, a low signal 62 and a high signal 70 are generated.

The delay $t_s$ is that delay introduced by the R-C (64,66) circuit and is a compensating network to take care of the delay introduced by capacitance other than double documents. This stray capacitance may be due to the metal conducting arms 36,38 of the sensing device 32 or to the length of wire connecting such arms to the circuitry. The differential delay between $t_s$ and $t_d$ is such that if $t_d$ is less than $t_s$, such as during single document transport, the signal 70 is not generated by reason of eliminating the stray capacitance signal 62.

It is thus seen that herein shown and described is a double document detection system which uses the document as the dielectric between the conducting arms of a sensing device and wherein a delay is introduced to generate a signal indicating multiple documents. The detection system enables the accomplishment of the objects and advantages mentioned above, and while a preferred embodiment of the invention has been disclosed herein, variations thereof may occur to those skilled in the art. It is thus contemplated that all such variations and modifications not departing from the spirit and scope of the invention hereof are to be construed in accordance with the following claims.

What is claimed is:

1. A double document detector comprising a
   conductive capacitor type sensing device operable for utilizing a document as the dielectric thereof and for generating a signal upon physically detecting a document,
   first R-C circuit means for introducing a capacitive delay in the generated signal due to the presence of one or more documents,
   AND gate means for comparing the generated signal with the delayed signal and generating an output signal,
   second R-C circuit means for introducing a capacitive delay in the output signal of said AND gate means to compensate for capacitance other than capacitance due to the presence of two or more documents, and
   inverter means receiving said delayed output signal from said AND gate means for generating a multiple document signal upon the presence of capacitive delay indicating that more than one document has been detected by said sensing device.

2. In a document handling apparatus, means for detecting the passage of double documents along a path comprising a
   conductive capacitor type sensing device operable for utilizing a document as the dielectric thereof and for generating a signal upon physically detecting a document,
   first R-C circuit means for introducing a delay in the generated signal due to the presence of a document,
   AND gate means for comparing the generated signal with the delayed signal and generating an output signal,
   second R-C circuit means for introducing a capacitive delay in the output signal of said AND gate means to compensate for capacitance other than capacitance due to the presence of two or more documents,
   and means receiving said delayed output signal from said AND gate means for generating a double document signal when said delayed output signal indicates that more than one document is detected by said sensing device.

3. A method of detecting double documents comprising the steps of:
   generating a signal upon physically detecting a document,
   introducing a capacitive delay in the generated signal due to presence of one or more documents,
   inverting the generated signal delayed due to presence of more than one document,
   comparing the generated signal with the delayed signal to generate and output signal,
   introducing a capacitive delay in the output signal to compensate for capacitance other than capacitance due to the presence of two or more documents, and
   generating a double document signal when the delayed output signal indicates that more than one document is detected.

* * * * *